United States Patent
Lee (10) Patent No.: US 7,009,926 B2
(45) Date of Patent: Mar. 7, 2006

(54) APPARATUS FOR RECORDING AND/OR REPRODUCING DATA WITH RESPECT TO INFORMATION STORAGE MEDIUM

(75) Inventor: Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 10/776,352

(22) Filed: Feb. 12, 2004

(65) Prior Publication Data

US 2004/0228253 A1   Nov. 18, 2004

(30) Foreign Application Priority Data

Feb. 15, 2003   (KR) ...................... 10-2003-0009627

(51) Int. Cl.
*G11B 5/09* (2006.01)

(52) U.S. Cl. ................................. 369/59.11; 369/59.25; 369/47.15

(58) Field of Classification Search ............. 369/59.25, 369/59.11, 53.22, 47.48, 47.27, 47.34, 47.15, 369/47.1, 53.1, 53.37, 59.14
See application file for complete search history.

(56) References Cited

U.S. PATENT DOCUMENTS

| | | |
|---|---|---|
| 5,687,397 A | 11/1997 | Ohmori |
| 5,737,639 A | 4/1998 | Ohmori |
| 5,825,726 A | 10/1998 | Hwang et al. |
| 5,914,917 A | 6/1999 | Bae |
| 6,038,208 A | 3/2000 | Shikunami et al. |
| 6,122,436 A | 9/2000 | Okada et al. |
| 6,128,264 A | 10/2000 | Tsutsui |
| 6,137,769 A | 10/2000 | Sawada et al. |
| 6,243,343 B1 | 6/2001 | Ishimura et al. |
| 6,424,615 B1 | 7/2002 | Ishimura et al. |
| 6,459,666 B1 | 10/2002 | Yokoi |

(Continued)

FOREIGN PATENT DOCUMENTS

| | | |
|---|---|---|
| KR | 1998-11091 | 4/1998 |
| KR | 1998-74789 | 11/1998 |

(Continued)

OTHER PUBLICATIONS

DRX-510 UL, High Performance External Dual RW DVD/CD Recorder for Microsoft Windows Operating Systems (Sony Electronics Inc. 2003).

(Continued)

*Primary Examiner*—Ali Neyzari
(74) *Attorney, Agent, or Firm*—Stein, McEwen & Bui, LLP (57) ABSTRACT

A recording and/or reproducing apparatus for use with an information storage medium that includes a lead-in area, a user data area, and a lead-out area is read by a recording and/or reproducing apparatus. Information about whether the information storage medium is compatible with a drive following an older version of standards is recorded in at least one of the lead-in and lead-out areas. Accordingly, the recording performance thereof is improved, and a drive following an older version of standards can record data on or reproduce data from a newer version of an information storage medium.

32 Claims, 7 Drawing Sheets

U.S. PATENT DOCUMENTS

| | | |
|---|---|---|
| 6,469,963 B1 | 10/2002 | Sawada et al. |
| 6,894,967 B1 * | 5/2005 | Tamaru et al. ............ 369/59.25 |
| 6,904,008 B1 * | 6/2005 | Kawashima et al. ..... 369/47.15 |
| 2002/0006084 A1 | 1/2002 | Kawashima et al. |
| 2002/0181376 A1 | 12/2002 | Acker |
| 2003/0012088 A1 | 1/2003 | Bakx et al. |
| 2003/0063540 A1 | 4/2003 | Kato et al. |
| 2003/0067859 A1 | 4/2003 | Weijenbergh et al. |
| 2003/0086345 A1 | 5/2003 | Ueki |
| 2003/0090981 A1 | 5/2003 | Yokoi |

FOREIGN PATENT DOCUMENTS

| | | |
|---|---|---|
| KR | 2001-85486 | 9/2001 |
| KR | 2001-85790 | 9/2001 |

OTHER PUBLICATIONS

DRU-510A High Performance Dual RW DVD/CD Recorder for Microsoft Windows 98SE, Windows Millennium Edition, Windows 2000, and Windows XP Operating Systems (Sony Electronics Inc. 2003).

* cited by examiner

APPARATUS FOR RECORDING AND/OR REPRODUCING DATA WITH RESPECT TO INFORMATION STORAGE MEDIUM

CROSS REFERENCE TO RELATED APPLICATION

This application claims the priority of Korean Patent Application No. 2003-9627, filed on Feb. 15, 2003, in the Korean Intellectual Property Office, the disclosure of which is incorporated herein in its entirety by reference.

BACKGROUND OF THE INVENTION

1. Field of the Invention

The present invention relates to an information storage medium, and more particularly, to an apparatus for use with an information storage medium which stores information about an optimal writing pattern or information about whether the information storage medium is compatible with a drive following an older version of standards.

2. Description of the Related Art

General information storage media are widely used as information recording media of optical pickup apparatuses for recording/reproducing information in a non-contact way. Optical disks, which are an example of information storage media, are classified as compact disks (CDs) or digital versatile disks (DVDs) according to their information storage capacity. Examples of recordable optical disks include 650 MB CD-R, CD-RW, 4.7 GB DVD/RW, DVD-RAM, and the like. Furthermore, HD-DVDs having a recording capacity of 20 GB or greater are under development.

With the increase in the recording capacity of optical disks, the recording speed thereof has also developed. However, the recording pattern of optical disks changes as the recording speed thereof increases.

Figure 1A:
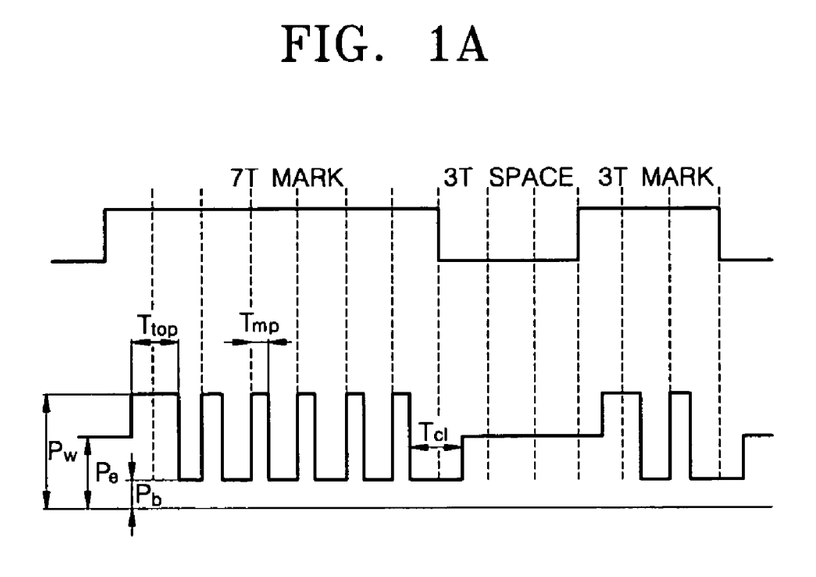
FIG. 1A shows a multi-pulse writing pattern.

FIG. 1A shows a writing pulse pattern widely used in CD-RW, DVD-RAM/R/RW, and the like. The writing pulse pattern of FIG. 1A includes multiple pulses to form each mark on the optical disk. The multi-pulse pattern is widely used to prevent distortion of the marks on the optical disk due to heat accumulation during mark formation. However, because the energy provided per unit time decreases with an increase in the recording speed of optical disks, an error may be generated when data is recorded according to the multi-pulse pattern.

Figure 1B:
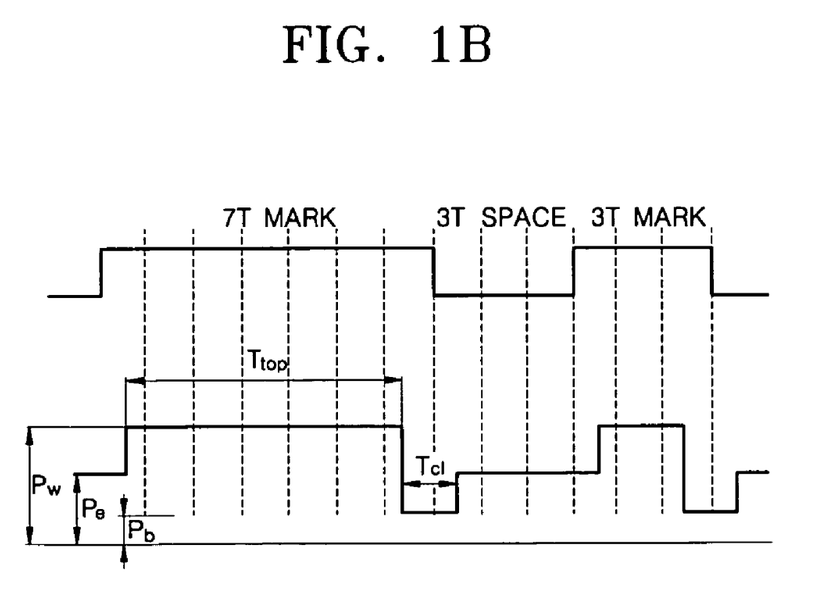
FIG. 1B shows a single-pulse writing pattern.

However, the reduction in the energy per unit time can be compensated for by using a single pulse for each mark, as shown in FIG. 1B, or by increasing bias power.

Figure 2:
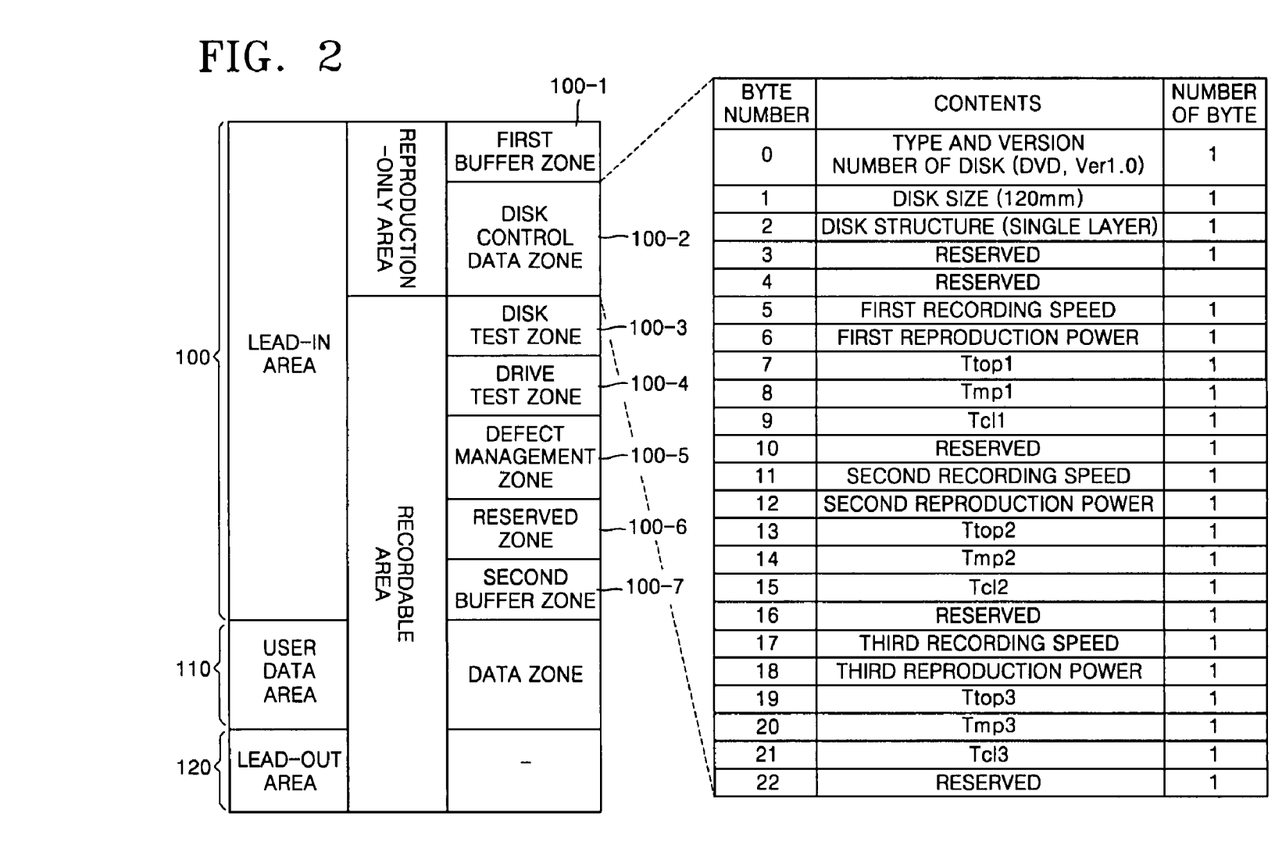
FIG. 2 shows a data area structure of a conventional information storage medium.

As described above, information storage media have different writing patterns, that is, writing strategies, according to their recording speeds. FIG. 2 shows a data area structure of a conventional information storage medium. As shown in FIG. 2, a conventional information storage medium includes a lead-in area 100, a user data area 110, and a lead-out area 120. Information about a data writing pattern is recorded in a disk control data zone 100-2 of the lead-in area 100.

The lead-in area 100 includes a first buffer zone 100-1, the disk control data zone 100-2, in which disk control-related information is recorded, a disk test zone 100-3, a drive test zone 100-4, a defect management zone 100-5, a reserved zone 100-6, and a second buffer zone 100-7. The disk control data zone 100-2 stores the disk-type, the disk version number, the disk size, information about a recording layer(s), and the like. The disk control data zone 100-2 also stores the information about the data writing pattern.

For example, the disk control data zone 100-2 may store information concerning first through third writing pattern types. The first writing pattern type can be a first multi-pulse pattern, the second writing pattern type can be a second multi-pulse pattern, and the third writing pattern type can be a single-pulse pattern. In FIGS. 1A and 1B, Ttop, Tmp, and Tcl are parameters of a writing pattern, namely, initial pulse time, multi-pulse time, and cooling pulse time, respectively. Pw, Pe, and Pb denote writing power, erasing power, and bias power, respectively. T denotes the minimum length of a recording mark. 3 T and 7 T denote the lengths of a mark or space.

For example, fifth through ninth bytes of the disk control data zone 100-2 store a first recording speed, a first reproduction power, Ttop1, Tmp1, and Tcl1, respectively, as the information about the first writing pattern type. A tenth byte of the disk control data zone 100-2 is reserved. Eleventh through fifteenth bytes of the disk control data zone 100-2 store a second recording speed, a second reproduction power, Ttop2, Tmp2, and Tcl2, respectively, as the information about the second writing pattern type. A sixteenth byte of the disk control data zone 100-2 is reserved. Seventeenth through twenty-first bytes of the disk control data zone 100-2 store a third recording speed, a third reproduction power, Ttop3, Tmp3, and Tcl3, respectively, as the information about the third writing pattern type. A twenty-second byte of the disk control data zone 100-2 is reserved.

As described above, the conventional information storage medium classifies the information about writing patterns according to the writing pattern type and stores the information. If information about several writing patterns has been recorded, when a drive records data in an information storage medium, it reads out the information about all of the writing patterns, selects a writing pattern suitable for the drive itself, and records data according to the selected writing pattern. In other words, after the information storage medium of FIG. 2 is loaded in the drive, the drive must test all of the first through third writing pattern types to find an optimal writing pattern. Consequently, the drive must be designed so as to include a function of testing writing patterns, thus complicating a drive design and increasing the duration of recording data.

In the conventional information storage medium of FIG. 2, information about its recording speed is recorded in the disk control data zone 100-2. Information about the version of the information storage medium, which prescribes a standard for the recording speed, is also recorded in the disk control data zone 100-2. When such a disk is loaded in a drive to record/reproduce data on/from the disk, the drive first reads out the information about the version of the loaded disk. If the version of the loaded disk is identical to the version of the drive, the drive records/reproduces data on/from the loaded disk.

However, when a new version of an information storage medium is developed, a drive corresponding to the new version must also be developed. A drive following an older version of standards cannot record/reproduce data on/from the information storage medium following the new version of standards. In other words, when an information storage medium is loaded in a drive, the drive reads the version information stored in the information storage medium and can record/reproduce data on/from the information storage medium only if their versions are identical. On the other hand, if the version of the loaded information storage medium is different from that of the drive on which the information storage medium is loaded, the drive cannot recognize the loaded information storage medium because the information storage medium stores version information different from the information about the version of the drive.

Accordingly, regardless of whether a drive is compatible with an information storage medium following a different version of standards, the drive automatically recognizes that it cannot record/reproduce data on/from the information storage medium following a different version of standards.

As described above, if an information storage medium following a new version of standards stores no information about a drive following an older version of standards, the new version of information storage medium cannot be used in the drive following an older version of standards, even if they are really compatible with one another. Hence, users suffer the inconvenience and expenses of having to use new drives whenever the newer version of an information storage medium is used.

BRIEF SUMMARY

One aspect of the present invention provides an information storage medium which stores information about an optimal writing pattern, information about a recording speed, or information about a drive following an old version of standards, thereby increasing the speed and performance of data recording.

According to one aspect of the present invention, there is provided a recordable information storage medium comprising a lead-in area, a user data area, and a lead-out area, wherein compatibility information about whether the information storage medium is compatible with a drive following a version of standards older than that of the information storage medium is recorded in at least one of the lead-in and lead-out areas.

When the information storage medium is operable in a drive following an older version of standards, the information storage medium may store information about an optimal writing pattern.

The compatibility information may be recorded in either a reproduction-only area or a recordable area of at least one of the lead-in and lead-out areas.

When the compatibility information is recorded in the reproduction-only area of at least one of the lead-in and lead-out areas, the compatibility information may be reproduced as a sum signal or a differential signal. When the compatibility information is recorded in the recordable area of at least one of the lead-in and lead-out areas, the compatibility information may be reproduced as a sum signal.

According to another aspect of the present invention, there is provided a recordable information storage medium comprising a lead-in area, a user data area, and a lead-out area, wherein information about which one of a multi-pulse write strategy and a single-pulse write strategy is used to record data is recorded in at least one of the lead-in and lead-out areas.

According to another aspect of the present invention, there is provided a recordable information storage medium comprising a lead-in area, a user data area, and a lead-out area, wherein information about an optimal writing pattern is recorded in at least one of the lead-in and lead-out areas.

The information about the optimal writing pattern may be recorded in a reproduction-only area of at least one of the lead-in and lead-out areas.

The reproduction-only area may be a disk control data zone included in the lead-in area to store disk-related information.

According to another aspect of the present invention, there is provided a method of recording information on an information storage medium, including: forming a lead-in area; forming a user data area; forming a lead-out area; and recording, in at least one of the lead-in and lead-out areas, one of compatibility information about whether the information storage medium is compatible with a drive following a version of standards older than that of the information storage medium, information about which one of a multi-pulse write strategy and a single-pulse write strategy is used to record data, and information about an optimal writing pattern.

According to another aspect of the present invention, there is provided a method of increasing data recording speed to a recordable information storage medium, including: forming a lead-in area; forming a user data area; forming a lead-out area; and recording, in at least one of the lead-in and lead-out areas, one of compatibility information about whether the information storage medium is compatible with a drive following a version of standards older than that of the information storage medium, information about which one of a multi-pulse write strategy and a single-pulse write strategy is used to record data, and information about an optimal writing pattern.

According to another aspect of the present invention, there is provided a method of improving recording performance to a recordable information storage medium, including: forming a lead-in area; forming a user data area; and forming a lead-out area; and recording, in at least one of the lead-in and lead-out areas, one of compatibility information about whether the information storage medium is compatible with a drive following a version of standards older than that of the information storage medium, information about which one of a multi-pulse write strategy and a single-pulse write strategy is used to record data, and information about an optimal writing pattern.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
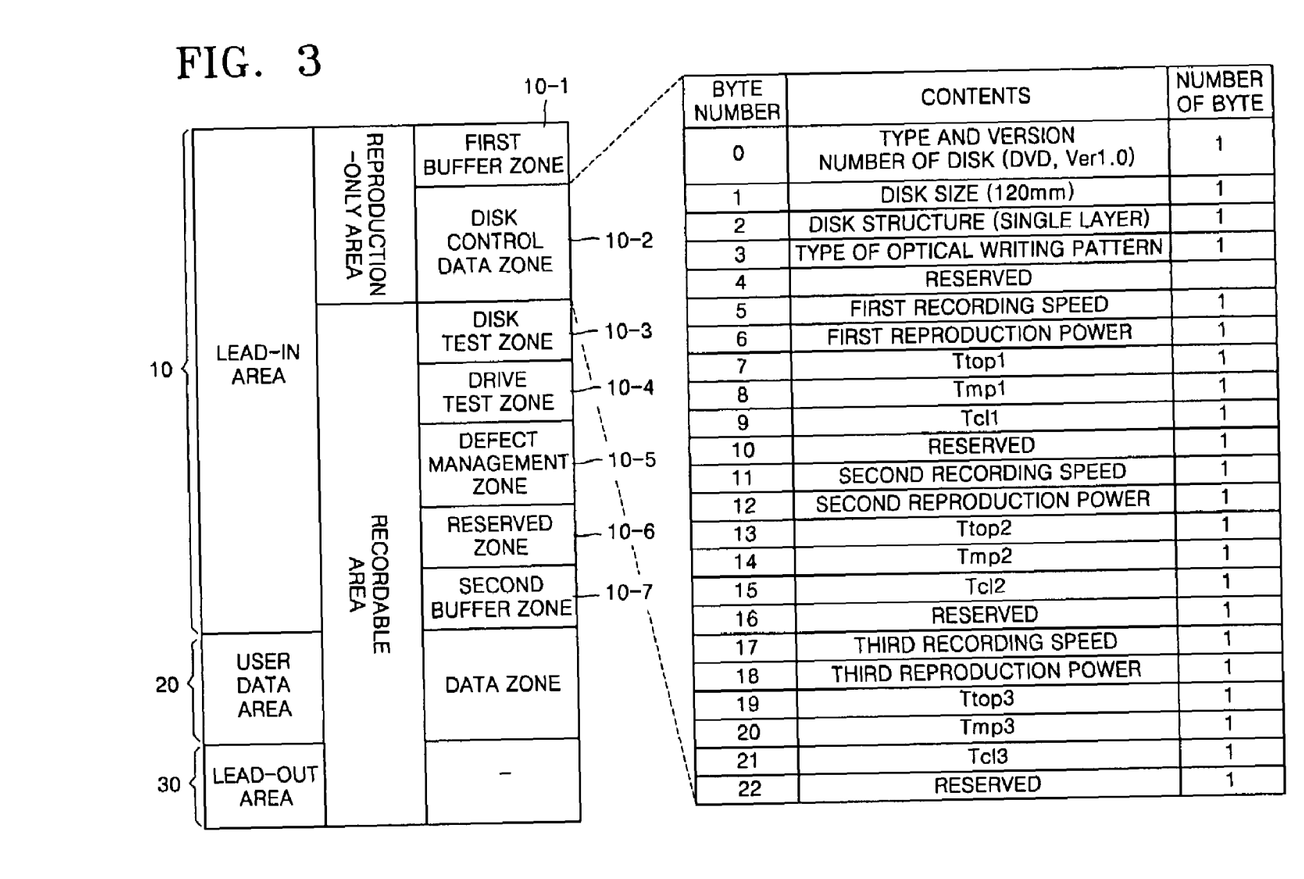
FIGS. 3 and 4 show data area structures of an information storage medium according to a first embodiment of the present invention.

FIG. 3 shows a data area structure of an information storage medium according to a first embodiment of the present invention. Referring to FIG. 3, an information storage medium according to a first embodiment of the present invention includes a lead-in area 10, a user data area 20, which stores user data, and a lead-out area 30.

The lead-in area 10 includes a disk control data zone 10-2, which-stores disk-related information, a disk test zone 10-3, which stores information used to test a disk, a drive text zone 10-4, which stores information used to test a drive, a defect management zone 10-5, which stores information used to remove a defect generated on the disk, and a reserved area 10-6. The lead-in area 10 further includes first and second buffer zones 10-1 and 10-7, respectively. The lead-in area 10 is divided into a reproduction-only area and a recordable area. For example, the first buffer zone 10-1 and the disk control data zone 10-2 are included in the reproduction-only area, where only reproduction occurs because data is recorded in the form of pits during the manufacturing of a disk. The disk test zone 10-3, the drive test zone 10-4, the defect management zone 10-5, the reserved zone 10-6, and the second buffer zone 10-7 are included in the recordable area.

The disk control data zone 10-2 stores information such as, the type of the disk, the version number thereof, the size thereof, information about writing patterns, and the like. The information about writing patterns may be information about first through third types of writing patterns. The information about the first writing pattern type is recorded in fifth through ninth bytes of the disk control data zone 10-2. The information about the second writing pattern type is recorded in eleventh through fifteenth bytes of the disk control data zone 10-2. The information about the third writing pattern type is recorded in seventeenth through twenty-first bytes of the disk control data zone 10-2. The information about writing patterns includes a recording speed, reproduction power, initial pulse time Ttop of a recording pattern, multi-pulse time Tmp of a recording pattern, cooling pulse time of a recording pattern, writing power Pw, erasing power Pe, bias power Pb, and the like.

As shown in FIG. 3, the information storage medium according to the first embodiment of the present invention stores information about an optimal writing pattern in the lead-in area 10. More specifically, the information about an optimal writing pattern is recordable in the reproduction-only area or recordable area of the lead-in area 10.

If the information about an optimal writing pattern is recorded in the reproduction-only area, it is recordable in the disk control data zone 10-2 of the lead-in area 10. When considering regulations for a disk, information about the optimal writing pattern is recorded in the form of pits when a disk is manufactured. The information about the optimal writing pattern is recorded in a specified byte of the disk control data zone 10-2, for example, a third byte. More specifically, the information about the optimal writing pattern is recordable in the zeroth through seventh bits of the third byte.

For example, if the optimal writing pattern is the first writing pattern type, 00000000b is recorded as the optimal writing pattern. If the optimal recording pattern is the second writing pattern type, 00000001b is recorded as the optimal writing pattern. If the optimal recording pattern is the third writing pattern type, 00000010b is recorded as the optimal writing pattern.

If data corresponding to the first writing pattern type is recorded as the optimal recording pattern, a drive reads out the data corresponding to information about the first writing pattern type. In other words, the drive reads out the data corresponding to the fifth through ninth bytes in which the information about the first writing pattern type is recorded, sets a condition corresponding to the read-out data, and records data according to the set condition.

Figure 4:
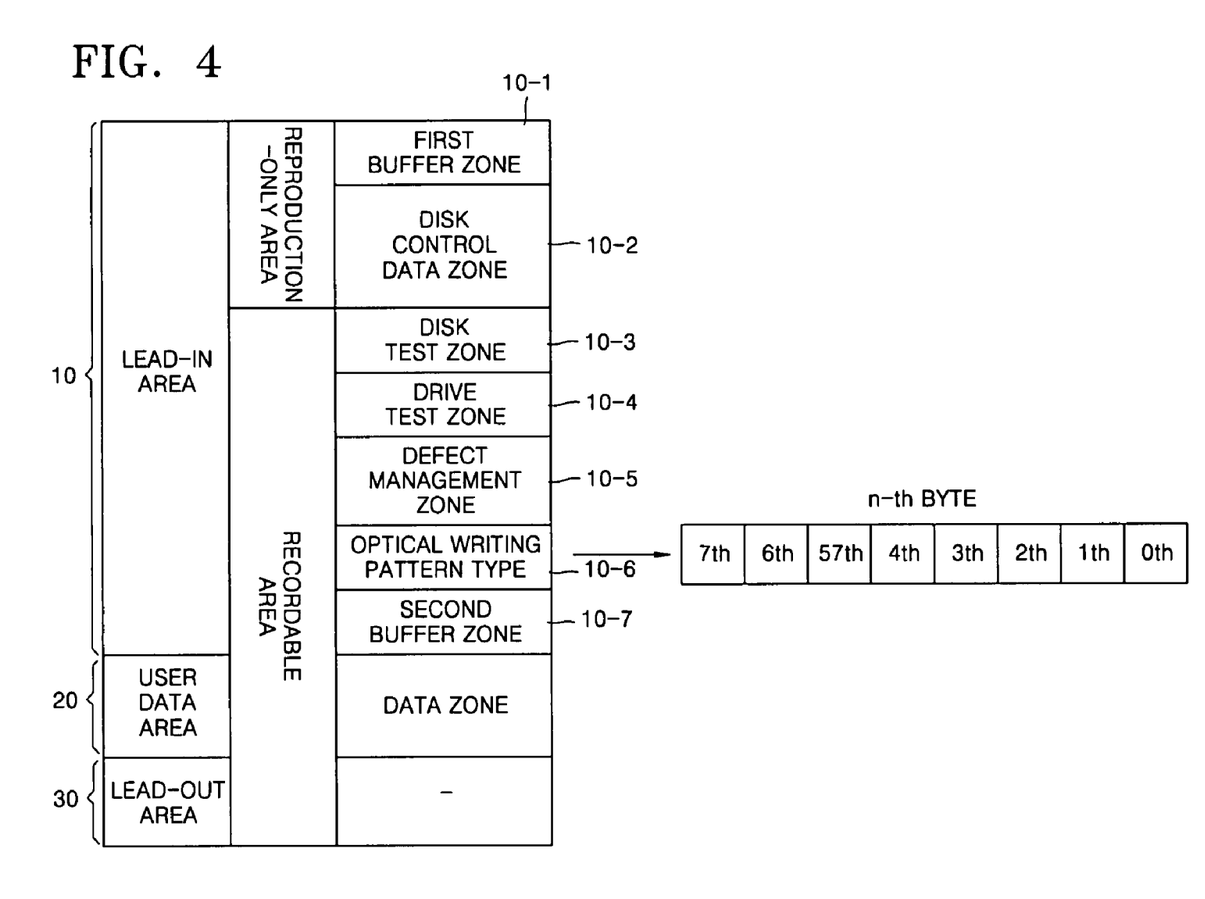

FIG. 4 shows another data area structure of the information storage medium according to the first embodiment of the present invention. Referring to FIG. 4, the information about the optimal writing pattern is recorded in the recordable area of the lead-in area 10. More specifically, the information about the optimal writing pattern is recorded in the reserved zone 10-6 of the recordable area. In this case, after a disk is manufactured, a writing pattern optimal for the manufactured disk is ascertained by testing the disk, and the optimal writing pattern is recorded in the reserved zone 10-6. Information about the optimal writing pattern is recorded in a specified byte of the reserved zone 10-6. For example, if the optimal writing pattern is the first writing pattern type, 00000000b is recorded as the optimal writing pattern. If the optimal recording pattern is the second writing pattern type, 00000001b is recorded as the optimal writing pattern. If the optimal recording pattern is the third writing pattern type, 00000010b is recorded as the optimal writing pattern.

If data corresponding to the second writing pattern type is recorded as the optimal recording pattern in the reserved zone 10-6, the drive reads out the data corresponding to information about the second writing pattern type recorded in the disk control data zone 10-2. In other words, referring to FIG. 3, the drive reads out the data corresponding to the tenth through fourteenth bytes in which the information about the second writing pattern type is recorded, sets a condition corresponding to the read-out data, and records data according to the set condition. The information recorded in the disk control data zone 10-2 of FIG. 4 is the same as that shown in FIG. 3 except that the information about the optimal writing pattern is recorded in a reserved zone, and so it is not shown in FIG. 4.

The information about the optimal writing pattern is recorded in both the lead-in area 10 and the lead-out area 30. Hence, when a defect is generated in the information recorded in one of the lead-in and lead-out areas 10 and 30, information stored in the other non-defective area is usable.

Although the case where only the information about the optimal writing pattern is recorded has been described above, the information about the optimal writing pattern is recordable together with information about the multiple speeds of the disk. For example, both the information about the optimal writing pattern and the information about the multiple speeds of the disk is recordable in a specified byte of the disk control data area 10-2 as shown in FIG. 3 or in a byte of the reserved zone 10-6 as shown in FIG. 4.

Examples of data representing both information about an optimal recording pattern and information about the multiple speeds of a disk are shown in Table 1.

TABLE 1

| Data | Information |
| --- | --- |
| 00000000 b | Multiple speed of n, first writing pattern |
| 10000000 b | Multiple speed of m, first writing pattern |
| 00000001 b | Multiple speed of n, second writing pattern |
| 10000000 b | Multiple speed of m, second writing pattern |

If the information about the optimal writing pattern together with information about the multiple speed is recorded in an information storage medium as shown in Table 1, the optimal writing pattern and the recording speed of the information storage medium are determined at the same time. Thus, a drive records data in the information storage medium with an improved performance.

If the information about the optimal writing pattern has been recorded in the reproduction-only area, it is reproducible as a sum signal or a differential signal. If the information about an optimal writing pattern has been recorded in the recordable area, it is reproducible as a sum signal.

Figure 5:
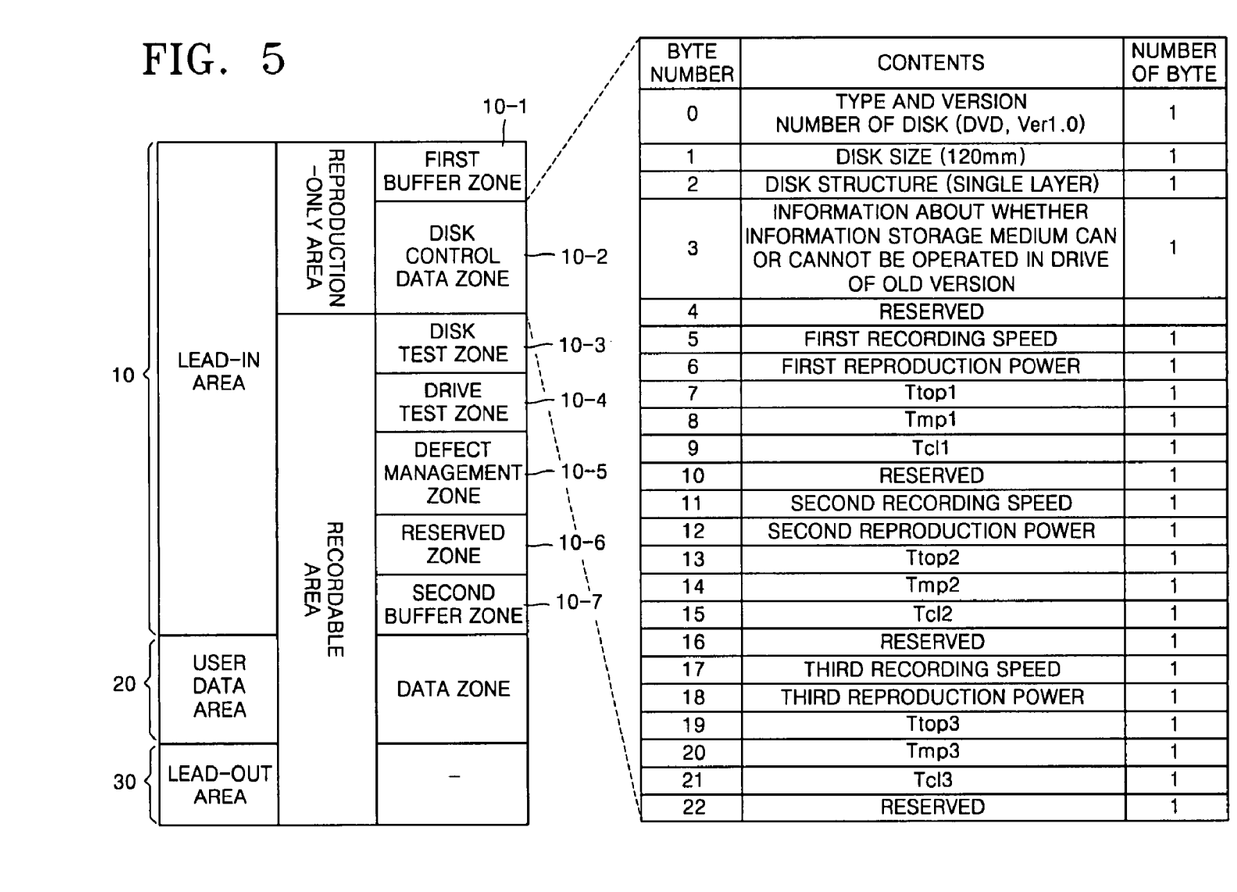
FIGS. 5 and 6 show data area structures of an information storage medium according to a second embodiment of the present invention.

A data area structure of an information storage medium according to a second embodiment of the present invention is shown in FIG. 5. Referring to FIG. 5, the information storage medium according to the second embodiment includes a lead-in area 10, a user data area 20, and a lead-out area 30 as in the first embodiment of the present invention. However, the information storage medium of the second embodiment of the present invention stores information about whether it can operate in a drive following a version of standards older than the version of standards followed by the information storage medium.

In general, information storage media following an identical standard have the same recording conditions. Every time a standard for information storage media changes, its version also changes. In general, because the recording conditions change for a newer version of an information storage medium, the newer information storage medium does not operate in a drive following an old version of standards. Also, an information storage medium following an old version of standards does not typically operate in a drive following a newer version of standards. However, there are exceptional cases where an information storage medium following a newer version of standards may operate in a drive following an old version of standards.

For example, an information storage medium operating at 3x-speed can always operate in a drive operating at 3x-speed. However, it is also possible for a 4x-speed information storage medium to operate in a 3x-speed drive, and a 2x- or 3x-speed information storage medium to operate in a 5x-speed drive.

If an information storage medium operating at a multiple speed of n ($5 \leq n \leq 8$) can operate in a 2x- or 3x-speed drive, the version of standards is definitely not changed. However, if an information storage medium cannot operate in a drive of a multiple speed of n, even when the information storage medium operates at its lowest speed, the version of standards must be changed. In other words, if an information storage medium cannot operate in an old version of drive even when it operates at its lowest speed, the version of standards must be changed.

However, when a new version of standards is developed, an information storage medium following the new version of standards is operable in a drive following an old version of standards. In this case, if the information storage medium following the new version of standards stores no information about the drive following the old version of standards, data recording will not occur in spite of the fact that the information storage medium following the new version of standards is operable in the drive following the old version of standards. Thus, an information storage medium following a new version of standards stores information about whether it is operable in a drive following an old version of standards.

The information about whether the information storage medium of FIG. 5 is or is not operable operate in a drive following an old version of standards is recorded in the reproduction-only area or recordable area of at least one of the lead-in and lead-out areas 10 and 30 of the information storage medium of FIG. 5. More specifically, this information is recorded in the bits of a specified byte of the reproduction-only area or recordable area. Because the data structures of the lead-in and lead-out areas 10 and 30 are similar to each other, only the lead-in area 10 will now be described. The description is applicable to the lead-out area 30.

Figure 6:
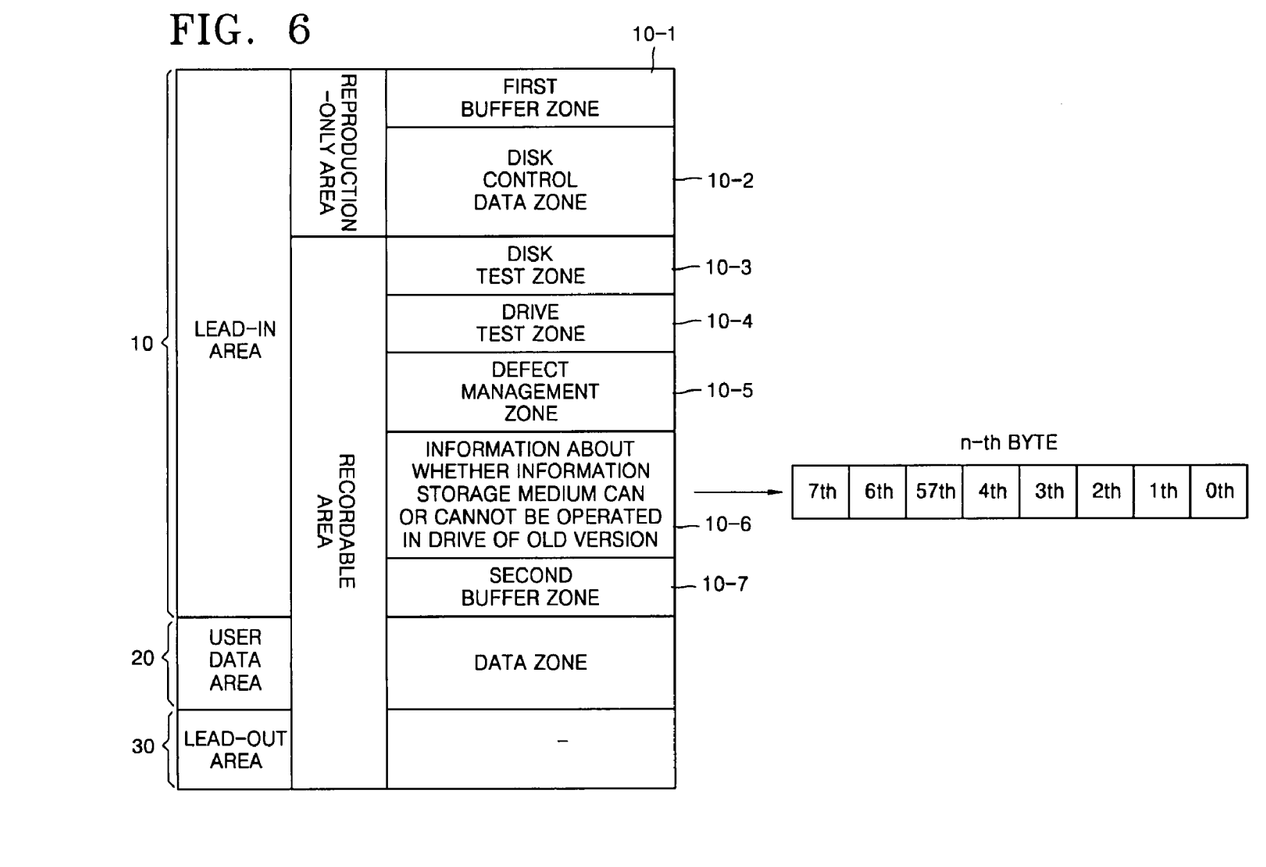

Referring to FIG. 5, the disk control data zone 10-2, which stores disk-related information, is included in the reproduction-only area of the lead-in area 10. The recordable area includes the disk test zone 10-3, the drive test zone 10-4, the defect management zone 10-5, and the reserved zone 10-6. FIG. 6 shows another data area structure of the information storage medium according to the second embodiment of the present invention. For example, referring to FIG. 6, the reserved zone 10-6 stores the information about whether the information storage medium is or is not operable in a drive following an old version of standards. If the information about whether the information storage medium is or is not operable in a drive following an old version of standards has been recorded in the form of pits in the reproduction-only area, it can be reproduced as a sum signal or a differential signal. If the information about whether the information storage medium is or is not operable in a drive following an old version of standard has been recorded in the recordable area, it can be reproduced as a sum signal.

Also, the information about whether the information storage medium is or is not operable in a drive following an old version of standards is recordable in both the lead-in area 10 and the lead-out area 30 so that when a defect is generated in the information recorded in one of the lead-in and lead-out areas 10 and 30, information stored in the other non-defective area is used.

As described above, if an information storage medium following an n version of standards stores information about whether it is compatible with a drive following a version of standards older than the n version (e.g., an x version of standards), the drive reads out this information to select a suitable information storage medium.

When the compatibility information is recorded in the n-version information storage medium, that information about an optimal writing pattern is also recorded. The information about the optimal writing pattern may be recorded in the same byte as, or in a byte different from, the byte in which the compatibility information is recorded. When the information about the optimal writing pattern and the compatibility information are recorded in an identical byte, they are recordable in the following way.

The two types of information are recordable in the form of a combination of bits in a specified byte of the reproduction-only area of or the recordable area of the lead-in area 10. For example, if 00000000b is recorded, the n version of information storage medium is not compatible with the drive following the x version of standards. If 00000001b is recorded, the n version of information storage medium is compatible with the drive following the x version of standard and the optimal writing pattern is the first writing pattern type. If 00000010b is recorded, the n version of information storage medium is compatible with the drive following the x version of standards and the optimal writing pattern is the second writing pattern type. If 00000011b is recorded, the n version of information storage medium is compatible with the drive following the x version of standards and the optimal writing pattern is the third writing pattern type.

Information about whether data is recordable efficiently using a writing pattern, particularly, using a multi-pulse write strategy, is recordable. The multi-pulse write strategy is not usable when the recording speed of an information storage medium is much greater than that of the drive. In other words, as the recording speed of an information storage medium becomes much greater than the drive speed, data is likely to be recorded in the information storage medium using a single-pulse write strategy rather than using the multi-pulse write strategy. Thus, if a new version of information storage medium is developed due to an increase in the recording speed, information about whether data can be efficiently recorded in the information storage medium by using the multi-pulse write strategy is recorded.

The information about whether data is or is not recordable using the multi-pulse write strategy is recordable in the recordable area or reproduction-only area of at least one of the lead-in and lead-out areas 10 and 30. The data structures of the recordable area and the reproduction-only area have already been described above. For example, 00000000b represents that data cannot be recorded using the multi-pulse write strategy, and 00000001b represents that data is recordable using the multi-pulse write strategy. Alternatively, 00000000b represents that data is recordable using a multi-pulse write strategy, and 00000001b represents that data is recordable using a single-pulse write strategy.

The information about whether data is or is not recordable using the multi-pulse write strategy may be recorded separately from, or together with, the information about whether an information storage medium is compatible with a drive following an old version of standards.

If the information about whether an information storage medium is compatible with a drive following an old version of standards and the information about whether data is or is not recordable using the multi-pulse write strategy have been recorded in the reproduction-only area of the lead-in area 10, they are reproducible as a sum signal or a differential signal. If the two types of information have been recorded in the recordable area, they can be reproduced as a sum signal.

The above description about an information storage medium according to the described embodiments of the present invention are also applicable to multi-layered information storage media having two or more recording layers.

Figure 7:
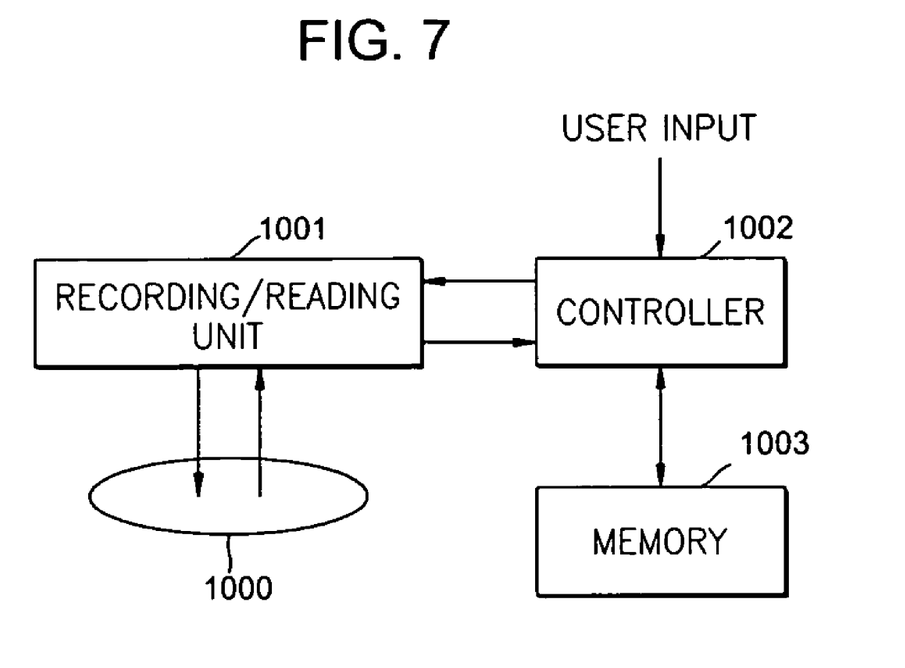
FIG. 7 is a block diagram of a recording apparatus according to an embodiment of the present invention.

FIG. 7 is a block diagram of a recording and/or reproducing apparatus according to an embodiment of the present invention. Referring to FIG. 7, the recording and/or reproducing apparatus includes a recording/reading unit 1001, a controller 1002, and a memory 1003. The recording/reading unit 1001 records data on a disc 1000, which is an embodiment of an information storage medium 1000 of the present invention, and reads the data from the disc 1000. The controller 1002 records and reproduces disc related data according to the present invention as set forth above in relation to FIGS. 3 through 6.

While not required in all aspects, it is understood that the controller 1002 can be computer implementing the method using a computer program encoded on a computer readable medium. The computer can be implemented as a chip having firmware, or can be a general or special purpose computer programmable to perform the method.

In addition, it is understood that, in order to achieve a recording capacity of several dozen gigabytes, the recording/reading unit 1001 could include a low wavelength, high numerical aperture type unit usable to record dozens of gigabytes of data on the disc 1000. Examples of such units include, but are not limited to, those units using light wavelengths of 405 nm and having numerical apertures of 0.85, those units compatible with Blu-ray discs, and/or those units compatible with Advanced Optical Discs (AOD).

As described above, an information storage medium according to the described embodiments of the present invention stores information about the optimal writing pattern, thereby increasing the speed of data recording. Recording data using the optimal writing pattern also improves the recording performance.

Furthermore, the information storage medium according to the described embodiments of the present invention stores information about whether it is compatible with a drive following an old version of standards, so that the drive following an old version of standards is usable even when the information storage medium follows a new version of standards. Thus, recording data is more convenient for the users.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A recording and/or reproducing apparatus for use with an information storage medium having a lead-in area, a user data area, and a lead-out area, the apparatus comprising:
   an optical pickup to transfer data with respect to the information storage medium; and
   a controller which controls the optical pickup to detect compatibility information about whether the information storage medium is compatible with a drive which uses a first version of standards older than a second version of the information storage medium and which is recorded in at least one of the lead-in and lead-out areas, and to control the optical pickup to transfer the data with respect to the information storage medium according to one of the first and second versions detected from the compatibility information which corresponds to a version of the recording and/or reproducing apparatus.

2. The apparatus of claim 1, wherein, the information storage medium stores information about an optimal writing pattern used by the drive in recording the information so that the information storage medium is operable in the drive following the first version of standards.

3. The apparatus of claim 1, wherein the information storage medium further stores strategy information about which one of a multi-pulse write strategy and a single-pulse write strategy is used to record data.

4. The apparatus of claim 1, wherein at least one of the lead-in and lead-out areas includes a reproduction-only area, and the compatibility information is recorded in the reproduction-only area.

5. The apparatus of claim 4, wherein the reproduction-only area is a disk control data zone which stores disk-related information used by the controller to control the information storage medium.

6. The apparatus of claim 4, wherein the controller reproduces the compatibility information as one of a sum signal and a differential signal.

7. The apparatus of claim 1, wherein at least one of the lead-in and lead-out areas includes a recordable area, and the compatibility information is recorded in the recordable area.

8. The apparatus of claim 7, wherein the controller reproduces the compatibility information as a sum signal.

9. The apparatus of claim 2, wherein information about the optimal writing pattern is recorded in one of the same byte as the byte in which the compatibility information is recorded and a byte different from the byte in which the compatibility information is recorded.

10. The apparatus of claim 9, wherein, when the information about the optimal write pattern and the compatibility information are recorded in the same byte, the optimal write pattern and the compatibility information are recorded in a specified byte of the lead-in area.

11. The apparatus of claim 1, wherein:
when 00000000b is recorded in a specified byte, the information storage medium uses an n version of a standard and is not compatible with a drive following a version of the standard older than n,
when 00000001b is recorded in the specified byte, the information storage medium uses the n version of the standard and is compatible with a drive following a version of the standard older than the n version and the optimal writing pattern is a first writing pattern type,
when 00000010b is recorded in the specified byte, the information storage medium uses the n version of the standard and is compatible with a drive following a version of the standard older than n and the optimal writing pattern is a second writing pattern type, and
when 00000011b is recorded in the specified byte, the information storage medium uses the n version of the standard and is compatible with a drive following a version of the standard older than n and the optimal writing pattern is a third writing pattern type.

12. The apparatus of claim 1, wherein the lead-in area includes:
a disk control data zone which stores disk-related information;
a disk test zone which stores information used to test an information storage medium;
a drive text zone which stores information used to test a drive;
a defect management zone which stores information used by the controller to remove a defect generated on the information storage medium; and
a reserved area.

13. The apparatus of claim 12, wherein the lead-in area further includes first and second buffer zones.

14. The apparatus of claim 13, wherein the lead-in area is divided into a reproduction-only area and a recordable area.

15. The apparatus of claim 14, wherein the first buffer zone and the disk control data zone are included in the reproduction-only area.

16. The apparatus of claim 15, wherein the disk test zone, the drive test zone, the defect management zone, the reserved zone, and the second buffer zone are included in the recordable area.

17. The apparatus of claim 12, wherein the information about writing patterns used by the controller includes at least one of a recording speed, a reproduction power, an initial pulse time (Ttop) of a recording pattern, a multi-pulse time (Tmp) of a recording pattern, a cooling pulse time of a recording pattern, a writing power (Pw), an erasing power (Pe), and a bias power (Pb).

18. A recording and/or reproducing apparatus for use with an information storage medium having a lead-in area, a user data area, and a lead-out area, the apparatus comprising:
an optical pickup to transfer data with respect to the information storage medium; and
a controller which controls the optical pickup to detect strategy information recorded in at least one of the lead-in and lead-out areas information storage medium that differentiates between and indicates which one of a multi-pulse write strategy and a single-pulse write strategy is used to record the data, and to control the optical pickup to transfer the data with respect to the information storage medium according to the detected strategy information.

19. The apparatus of claim 18, wherein at least one of the lead-in and lead-out areas includes a reproduction-only area, and the strategy information is recorded in the reproduction-only area.

20. The apparatus of claim 19, wherein the reproduction-only area is a disk control data zone which stores disk-related information used by the controller to control the information storage medium.

21. The apparatus of claim of claim 19, wherein the controller reproduces the strategy information as one of a sum signal and a differential signal.

22. The apparatus of claim 18, wherein at least one of the lead-in and lead-out areas includes a recordable area, and the strategy information is recorded in the recordable area.

23. The apparatus of claim 22, wherein the strategy information is reproduced as a sum signal.

24. A recording and/or reproducing apparatus for use with an information storage medium having a lead-in area, a user data area, and a lead-out area, the apparatus comprising:
an optical pickup to transfer data with respect to the information storage medium; and
a controller which controls the optical pickup to detect strategy information recorded in at least one of the lead-in and lead-out areas information storage medium about an optimal writing pattern, and to control the optical pickup to transfer the data with respect to the information storage medium according to the detected strategy information.

25. The apparatus of claim 24, wherein at least one of the lead-in and lead-out areas includes a reproduction-only area, and the information about the optimal writing pattern is recorded in the reproduction-only area.

26. The apparatus of claim 25, wherein the reproduction-only area is a disk control data zone included in the lead-in area to store disk-related information.

27. The apparatus of claim 25, wherein the controller reproduces the information about the optimal writing pattern as one of a sum signal and a differential signal.

28. The apparatus of claim 24, wherein at least one of the lead-in and lead-out areas includes a recordable area, and the information about the optimal writing pattern is recorded in the recordable area.

29. The apparatus of claim 28, wherein the lead-in area includes a recordable reserved area, and the information about the optimal writing pattern is recorded in the recordable reserved area.

30. The apparatus of claim 28, wherein the controller reproduces the information about the optimal writing pattern as a sum signal.

31. The apparatus of claim 24, wherein the information about the optimal writing pattern is recorded as a combination of bits.

32. The apparatus of claim 24, wherein the information about the optimal writing pattern is recorded together with information about a recording speed of the information storage medium.

* * * * *